US012706766B2

(12) United States Patent
Chan

(10) Patent No.: US 12,706,766 B2
(45) Date of Patent: Aug. 11, 2026

(54) SYSTEM AND METHOD FOR PRESENTING DOCUMENTS IN ONLINE MEETINGS

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 63 days.

(21) Appl. No.: 18/981,934

(22) Filed: Dec. 16, 2024

(65) Prior Publication Data

US 2025/0211456 A1 Jun. 26, 2025

(30) Foreign Application Priority Data

Dec. 25, 2023 (TW) ................................ 112150639

(51) Int. Cl.
*H04L 12/18* (2006.01)
*G06F 9/445* (2018.01)
*G06F 21/62* (2013.01)

(52) U.S. Cl.
CPC ...... *H04L 12/1813* (2013.01); *G06F 9/44526* (2013.01); *G06F 21/6209* (2013.01)

(58) Field of Classification Search
CPC ............. H04L 12/1813; H04L 12/1822; H04L 65/1069; H04L 65/403; H04L 65/75; H04L 67/06; G06F 9/44526; G06F 21/6209
See application file for complete search history.

(56) References Cited

U.S. PATENT DOCUMENTS 12,592,959 B2 * 3/2026 Mulugeta ............ H04L 63/1441
2011/0264745 A1 * 10/2011 Ferlitsch .............. G06Q 10/109 709/204
2013/0110925 A1 * 5/2013 Wessling ............ G06Q 10/109 709/204
2013/0198733 A1 * 8/2013 Farrell ................ G06F 9/44526 717/173
2018/0060979 A1 * 3/2018 Mcnairn ................ G06Q 50/14
2022/0094677 A1 * 3/2022 Roy ........................ H04L 63/08
2022/0270609 A1 * 8/2022 Kathpalia .............. G06N 20/00
2023/0169135 A1 * 6/2023 Panikkar .............. H04L 63/168 726/2
2025/0004626 A1 * 1/2025 Shi ........................ G06F 40/205

* cited by examiner

*Primary Examiner* — Azizul Choudhury
(74) *Attorney, Agent, or Firm* — MUNCY, GEISSLER, OLDS & LOWE, P.C.

(57) ABSTRACT

A system and a method for presenting documents in online meetings are provided to present the documents to other participants in the online meeting anytime and avoid spending time repeatedly looking for documents. The system includes a first user device installed with a document application program and an online meeting application program and configured to set a plugin in the document application program and open document file with the document application program to display the document content of the document file; a meeting server; and a second user device installed with a document application program. When the first user device triggers the plugin, the online meeting application program installed in the first user device starts to transmit an online meeting setting command and the document content to the meeting server, such that the meeting server sets up an online meeting and the document application program presents the document content.

6 Claims, 3 Drawing Sheets

S01 setting a plugin in a document application program that is installed in a first user device S02 by the first user device, opening a document file with the document application program to display the document content of the document file S03 starting an online meeting application program that is installed in the first user device S04 by the online meeting application program, transmitting an online meeting setting command to the meeting server, wherein the online meeting setting command includes meeting member data and the meeting member data include a second user device S05 by the meeting server, setting up an online meeting and transmitting a notification message to the second user device according to the meeting member data S06 by the second user device, starting an online meeting application program installed in the second user device according to the notification message, wherein the first user device and the second user device use the online meeting application programs installed therein to participate in the online meeting set up by the meeting server S07 when presenting the document content, the first user device triggers the plugin of the document application program such that the online meeting application program retrieves the document content and transmits the document content to the meeting server S08 by the meeting server, transmitting the document content to the second user device according to the meeting member data S09 by the online application program installed in the second user device, presenting the document content

SYSTEM AND METHOD FOR PRESENTING DOCUMENTS IN ONLINE MEETINGS

BACKGROUND OF THE INVENTION

This application claims priority for the TW patent application Ser. No. 11/215,0639 filed on 25 Dec. 2023, the content of which is incorporated by reference in its entirely.

FIELD OF THE INVENTION

The present invention relates to a system and a method for presenting documents in online meetings, particularly to a system and a method for presenting documents in online meetings that can present the documents to other participants in the online meeting at any time and avoid spending time repeatedly looking for documents.

DESCRIPTION OF THE RELATED ART

In the past online meeting technology, when participants need to present documents to other meeting participants, the common operating process is relatively cumbersome and lengthy. Firstly, before starting an online meeting, users will search for the required document on their local computers to confirm the exact path locations of the documents. This step itself may take some time, especially when the user has a large number of documents and folders to review.

After users confirm the location of the document, they will join the online meeting. However, in this online meeting platform, in order to present the document, the users often need to browse and find the same document path again. This not only means that users must repeat the same operating steps to increase the complexity of the operation but may also encounter difficulties in the second search step due to various reasons (such as forgotten paths, document movement, or simple negligence).

The operating method has two main problems. Firstly, users may make errors when searching for documents and such errors may cause the users to fail to present the correct document or experience unnecessary delays in the presenting process. Secondly, even if the user can successfully find the document, this repeated search process will undoubtedly increase the user's operation time and affect the efficiency of the meeting.

Therefore, the traditional online meeting document presenting method not only increases the user's operational burden but may also affect the speed and effect of the meeting. This makes presenting documents in online meetings a problem worth improving.

SUMMARY OF THE INVENTION

The primary objective of the present invention is to provide a system and a method for presenting documents in online meetings, which can present the documents to other participants in the online meeting at any time.

Another objective of the present invention is to provide a system and a method for presenting documents in online meetings, which can avoid spending time repeatedly looking for documents.

In order to achieve the foregoing objectives, the present invention provides a method for presenting documents in online meetings. The method is applied to an online meeting system that includes a plurality of user devices and a meeting server. The method includes:

Step (A): setting a plugin in a document application program that is installed in a first user device of the plurality of user devices;

Step (B): by the first user device, opening a document file with the document application program to display the document content of the document file;

Step (C): triggering the plugin to start an online meeting application program that is installed in the first user device;

Step (D): by the online meeting application program, retrieving the document content and transmitting an online meeting setting command and the document content to the meeting server, wherein the online meeting setting command comprises meeting member data and the meeting member data include a second user device of the plurality of user devices;

Step (E): by the meeting server, setting up an online meeting data and transmitting a notification message and the document content to the second user device according to the meeting member data; and Step (F): by the second user device, starting an online meeting application program installed in the second user device to present the document content according to the notification message, wherein the first user device and the second user device use the online meeting application programs installed therein to participate in the online meeting set up by the meeting server.

The present invention also provides a method for presenting documents in online meetings. The method is applied to an online meeting system that includes a plurality of user devices and a meeting server. The method includes:

Step (A): setting a plugin in a document application program that is installed in a first user device of the plurality of user devices;

Step (B): by the first user device, opening a document file with the document application program to display the document content of the document file;

Step (C): triggering the plugin to start an online meeting application program that is installed in the first user device Step (D): by the online meeting application program, transmitting an online meeting setting command to the meeting server, wherein the online meeting setting command comprises meeting member data and the meeting member data include a second user device of the plurality of user devices;

Step (E): by the meeting server, setting up an online meeting and transmitting a notification message to the second user device according to the meeting member data;

Step (F): by the second user device, starting an online meeting application program installed in the second user device according to the notification message, wherein the first user device and the second user device use the online meeting application programs installed therein to participate in the online meeting set up by the meeting server;

Step (G): when presenting the document content, the first user device triggers the plugin in the document application program such that the online meeting application program retrieves the document content and transmits the document content to the meeting server;

Step (H): by the meeting server, transmitting the document content to the second user device according to the meeting member data; and Step (I): by the online application program installed in the second user device, presenting the document content.

The present invention further provides a system for presenting documents in online meetings. The system includes:

a first user device installed with a document application program and an online meeting application program therein and configured to set a plugin in the document application program and open document file with the document application program to display the document content of the document file;

a meeting server;

a second user device installed with a document application program therein;

wherein when the first user device triggers the plugin, the online meeting application program installed in the first user device starts to retrieve the document content and transmit an online meeting setting command and the document content to the meeting server, and the online meeting setting command includes meeting member data and the meeting member data include the second user device;

wherein the meeting server sets up an online meeting and transmits a notification message and the document content to the second user device according to the meeting member data; and wherein the second user device starts an online meeting application program installed in the second user device to present the document content according to the notification message, wherein the first user device and the second user device use the online meeting application programs installed therein to participate in the online meeting set up by the meeting server.

The present invention additionally provides a system for presenting documents in online meetings. The system includes:

a first user device installed with a document application program and an online meeting application program therein and configured to set a plugin in the document application program and open a document file with the document application program to display the document content of the document file;

a meeting server;

a second user device installed with a document application program therein;

wherein an online meeting application program installed in the first user device starts to transmit an online meeting setting command to the meeting server, and the online meeting setting command includes meeting member data and the meeting member data include the second user device;

wherein the meeting server sets up an online meeting and transmits a notification message to the second user device according to the meeting member data, the second user device starts the online meeting application program installed in the second user device according to the notification message, wherein the first user device and the second user device use the online meeting application programs installed therein to participate in the online meeting set up by the meeting server; and wherein when presenting the document content, the first user device triggers the plugin in the document application program such that the online meeting application program retrieves the document content and transmits the document content to the meeting server, the meeting server transmits the document content to the second user device according to the meeting member data, and the online application program installed in the second user device presents the document content.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementations cover the characteristics of specific embodiments and the steps and sequences of the method used to construct and operate these specific embodiments. However, other specific embodiments can also be used to achieve the same or equal functions and sequence of steps.

It should be noted that, unless otherwise specified, all functions described herein may be implemented in hardware or used as software instructions that enable a computer to perform predetermined operations, wherein the software instructions are implemented in a computer-readable storage media, such as a random-access memory (RAM), a hard disk drive, a flash memory, or other types of a computer-readable storage media known to those skilled in the art. In some embodiments, the predetermined operations of the computer are performed by a processor, such as a computer, or performed by program codes such as computer program codes or program codes of software or firmware. In some embodiments, the predetermined operations of the computer are performed by integrated circuits encoded to perform these functions. Furthermore, it should be understood that various operations described herein as being performed by a user may be performed manually by the user, or may be automatically performed with or without instructions provided by the user.

Figure 1:
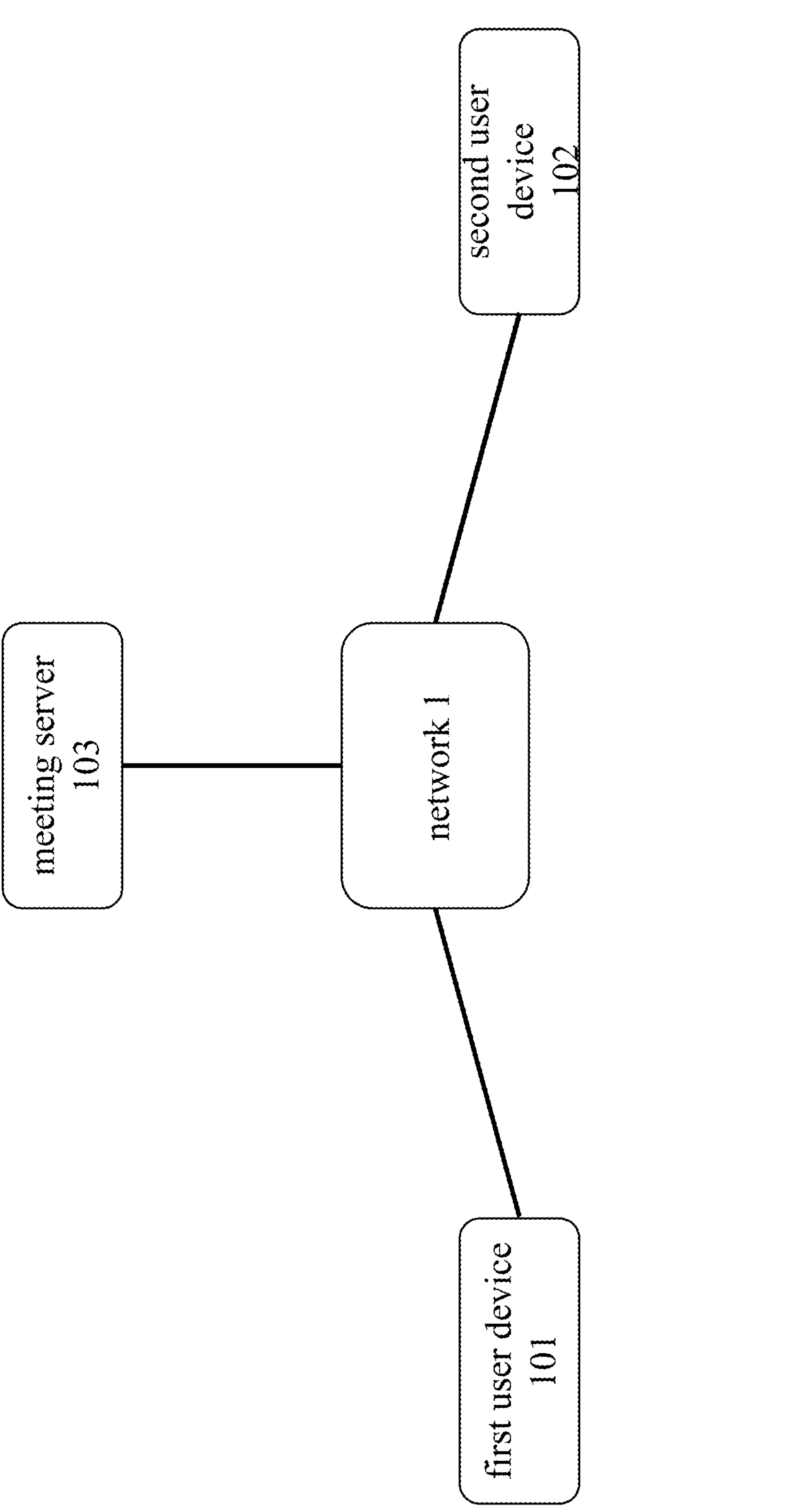
FIG. 1 is a schematic diagram illustrating a system for presenting documents in online meetings according to a preferred embodiment of the present invention.

Please refer to FIG. 1. FIG. 1 is a schematic diagram illustrating a system for presenting documents in online meetings according to a preferred embodiment of the present invention. The system can include a plurality of user devices and a meeting server 103. In implementations, the number of user devices can be very large such that multiple users participate in online meetings. However, in order to simplify the description, this embodiment is exemplified by two user devices, namely a first user device 101 and a second user device 102. The first user device 101, the second user device 102, and the meeting server 103, electrically connected to each other through a network 1, transmit data to each other.

Each of the first user device 101 and the second user device 102 is installed with an online meeting application program therein (not illustrated). Th first user device 101 is further installed with a document application program therein (not illustrated). If there is a need to quickly present documents to other participants in an online meeting, the first user device 101 will set a plugin (not illustrated) in the document application program. For example, in the embodiment, the first user device 101's documents application program is provided with a plugin. In an embodiment of the present invention, the document application program may come from the Microsoft Office application suite of Microsoft Corp., such as MICROSOFT WORD, MICROSOFT EXCEL, or MICROSOFT POWERPOINT, all of which are registered trademarks of Microsoft Corp. The plugin (i.e., Plug-in, add-in, addin, add-on, addon, or extension) is a computer program that collaborates with an application program (such as a document application program, a web browser, or an email client terminal) to add some specific functionality required for the application program. The plugin in the present invention can be regarded as functional extension. The document application program installed with the plugin can present documents to other participants of the online meeting at any time according to the requirements of the user and avoid spending time repeatedly looking for documents. The user devices in the present invention can be any hardware devices that can be connected to a network 1. The user devices may include, but are not limited to, smart phones, tablet computers, notebook computers, and desktop computers.

The meeting server 103 is installed with an online meeting application program (not illustrated) therein. The online meeting application program runs based on the hardware architecture of the meeting server 103. The hardware architecture of the meeting server 103 is not much different from that of a general server. The meeting server 103 may include a central processing unit, a memory, a storage device (such as a hard disk), an input/output unit, etc. Although the hardware devices are not illustrated in FIG. 1, their architectures should be understood by those skilled in the server field. In addition, one of the important hardware devices in the meeting server 103 is a network communication interface (not illustrated), which includes important software and firmware components (sometimes the components also include program software running on the operating system) connecting the meeting server 103 with external hardware through the network 1. The software and firmware components can include network cards, connection cables, and wireless communication modules. Although only one meeting server 103 is illustrated in FIG. 1, it is for example only. In implementations, depending on different module characteristics and traffic requirements, the number of meeting servers 103 may be one or several.

Implementation Scenario 1: first open a document and then set up an online meeting and present the document to other participants.

Figure 2:
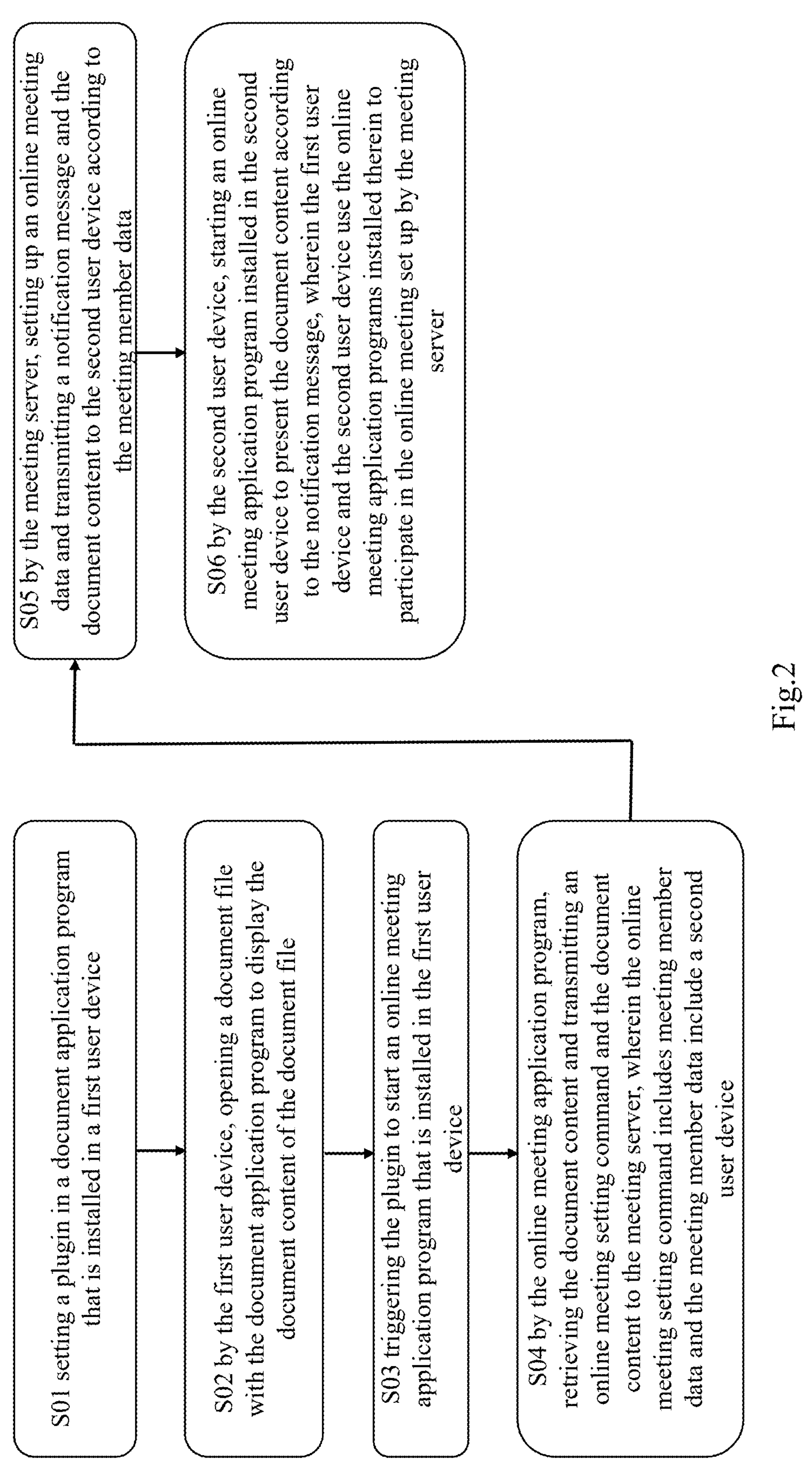
FIG. 2 is a flowchart of a method for presenting documents in online meetings according to a preferred embodiment of the present invention.

FIG. 2 is a flowchart of a method for presenting documents in online meetings according to a preferred embodiment of the present invention. In the embodiment, it will be described that the first user device 101 first opens a document file, then triggers the plugin to start the online meeting application program, and finally presents the content of the document file.

In Step S01 of FIG. 2, a plugin is set in a document application program that is installed in the first user device 101. The document application program in the embodiment may come from the Microsoft Office application suite, such as MICROSOFT POWERPOINT, but the present invention is not limited thereto. In Step S02, the first user device 101 opens a document file with the document application program to display the document content of the document file. The document file in the embodiment may be a POWERPOINT slide file (.ppt), a WORD file (.doc), or an EXCEL worksheet file (.xlsx), but the present invention is not limited thereto.

In Step S03, the plugin is triggered to start an online meeting application program that is installed in the first user device 101. For example, the first user device 101 is a desktop computer. The user operates a mouse to trigger a plugin in MICROSOFT POWERPOINT, thereby starting the online meeting application program installed in the first user device 101. In this step, the online meeting application program installed in the first user device 101 can provide a contact list (for example, a window that pops up to display a contact list). A part of user devices in the contact list are selected as meeting member data. Alternatively, the online meeting application program uses a given user device list as the meeting member data.

The meeting member data are related to the data of other members participating in the online meeting, so that the meeting server 103 can determine an object to which a notification message and the document content should be transmitted. In order to simplify the description in the embodiment, it is assumed that only the first user device 101 and the second user device 102 participate in the online meeting. Thus, the meeting member data in the embodiment only includes the second user device 102. If the members participating in the online meeting include other user devices, the meeting member data will also include the data of other user devices.

In addition, when the online meeting application program installed in the first user device 101 sets the meeting member data, the online meeting application program installed in the first user device 101 sets the access permissions of other members participating in the online meeting to the presented document content in the meeting member data (for example, the window that displays the contact list further provides a select box for each member's access permission). The access permissions can include, but are not limited to, a permission to read the document content or a permission to store the document content, etc.

In Step S04, the online meeting application program retrieves the document content and transmits an online meeting setting command and the document content to the meeting server 103. The online meeting setting command includes meeting member data. The meeting member data include the second user device 102. In the present invention, the manner that the online meeting application program retrieves the document content and transmits the document content to the meeting server 103 may be, for example, either streaming the pictures of the document content to the meeting server 103 or capturing the pictures of the document content as a picture file and then transmitting the picture file to the meeting server 103, but the present invention is not limited thereto.

In Step S05, the meeting server 103 sets up an online meeting data and transmits a notification message and the document content to the second user device 102 according to the meeting member data. In the embodiment, the meeting member data only includes the second user device 102. As a result, the members of the online meeting set up by the meeting server 103 only include the first user device 101 and the second user device 102. In addition, the meeting member data may also include the access permission of the second user device 102 to the document content. Therefore, the notification message transmitted by the meeting server 103 according to the meeting member data also includes the access permission of the second user device 102 to the document content.

In Step S06, the second user device 102 starts an online meeting application program installed in the second user device 102 to present the document content according to the notification message. The first user device 101 and the second user device 102 use the online meeting application programs installed therein to participate in the online meeting set up by the meeting server 103. In the embodiment of the present invention, the notification message also includes the access permission of the second user device 102 to the document content. Therefore, when the second user device 102 reads or stores the received document content, the corresponding actions are performed based on the access permissions of the second user device 102 set by the first user device 101. For example, the access permissions include a permission to read the document content or a permission to store the document content, etc.

According to the foregoing description, the method for presenting documents in online meetings of the present invention allows the user to trigger the plugin in the document application program to immediately start the online meeting application program to set up an online meeting and present the document content of the document file to other user devices participating in the online meeting after the user opens the document file with the document application program. When starting the online meeting application program, a contact list can be provided to select a part of the user devices as the meeting member data or a given user device list is used as the meeting member data. In addition, the access permissions of each user device to the document content can be further set.

Implementation Scenario 2: first open a document and then set up an online meeting and present the document to other participants according to requirements.

Figure 3:
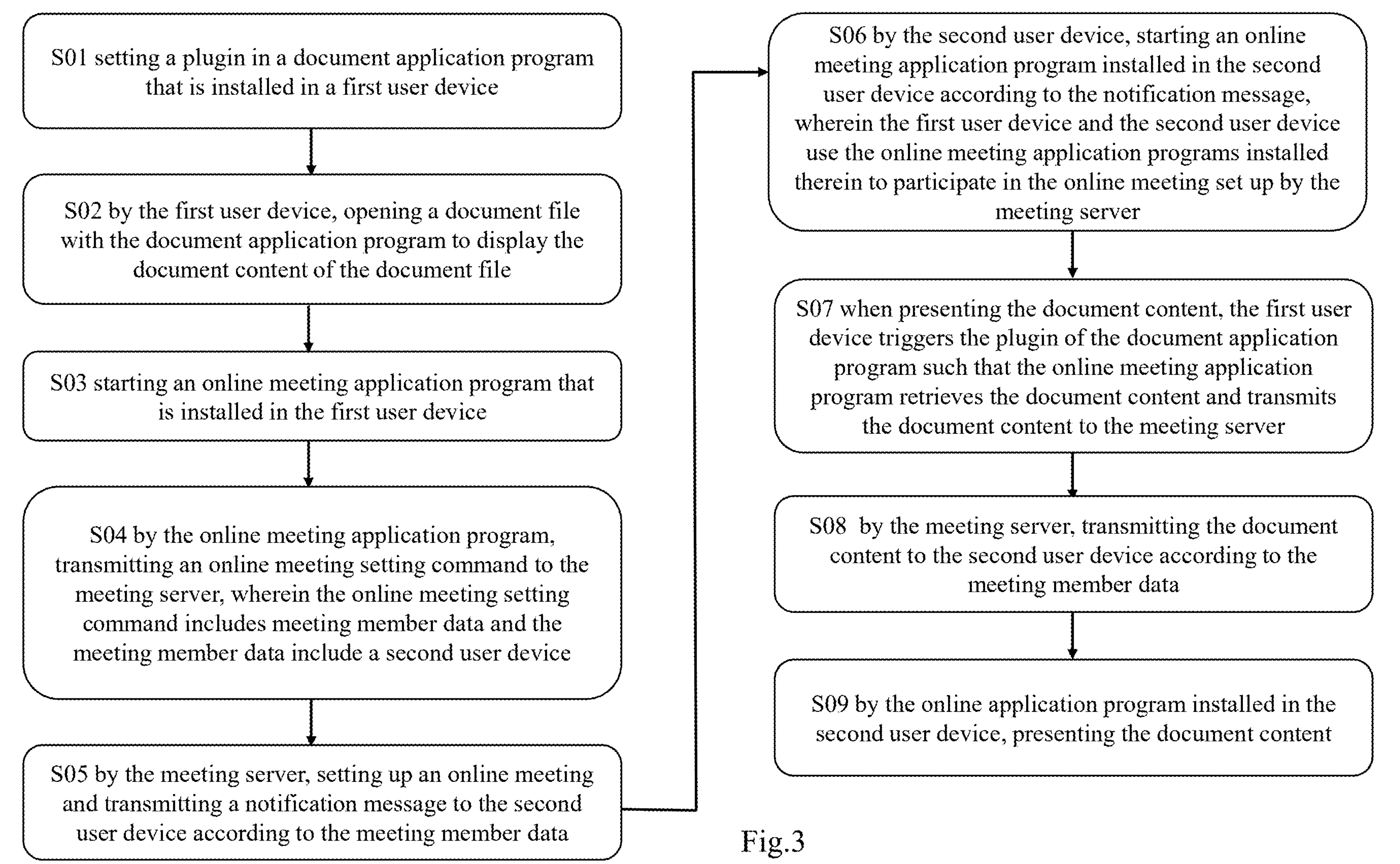
FIG. 3 is a flowchart of a method for presenting documents in online meetings according to another preferred embodiment of the present invention.

FIG. 3 is a flowchart of a method for presenting documents in online meetings according to another preferred embodiment of the present invention. In the embodiment, it will be described that the first user device 101 first opens a document file, then starts the online meeting application program to set up an online meeting, and finally presents the content of the document file according to requirements.

In Step S01 of FIG. 3, a plugin is set in a document application program that is installed in the first user device 101. The document application program in the embodiment may come from the Microsoft Office application suite, such as MICROSOFT POWERPOINT, but the present invention is not limited thereto.

In Step S02, the first user device 101 opens a document file with the document application program to display the document content of the document file. The document file in the embodiment may be a POWERPOINT slide file (.ppt), a WORD file (.doc), or an EXCEL worksheet file (.xlsx), but the present invention is not limited thereto.

In Step S03, an online meeting application program that is installed in the first user device 101 is started. In this step, the online meeting application program installed in the first user device 101 can provide a contact list (for example, a window that pops up to display a contact list). A part of user devices in the contact list are selected as meeting member data. Alternatively, the online meeting application program uses a given user device list as the meeting member data.

The meeting member data are related to the data of other members participating in the online meeting, so that the meeting server 103 can determine an object to which a notification message and the document content should be transmitted. In order to simplify the description in the embodiment, the meeting member data in the embodiment only includes the second user device 102. If the members participating in the online meeting include other user devices, the meeting member data will also include the data of other user devices.

In addition, when the online meeting application program installed in the first user device 101 sets the meeting member data, the online meeting application program installed in the first user device 101 sets the access permissions of other members participating in the online meeting to the presented document content in the meeting member data (for example, the window that displays the contact list further provides a select box for each member's access permission). The access permissions can include, but are not limited to, a permission to read the document content or a permission to store the document content, etc.

In Step S04, the online meeting application program transmits an online meeting setting command to the meeting server 103. The online meeting setting command includes meeting member data. The meeting member data include the second user device 102.

In Step S05, the meeting server 103 sets up an online meeting data and transmits a notification message to the second user device 102 according to the meeting member data. In the embodiment, the meeting member data only includes the second user device 102. As a result, the members of the online meeting set up by the meeting server 103 only include the first user device 101 and the second user device 102. In addition, the meeting member data may also include the access permission of the second user device 102 to the document content. Therefore, the notification message transmitted by the meeting server 103 according to the meeting member data also includes the access permission of the second user device 102 to the document content.

In Step S06, the second user device 102 starts an online meeting application program installed in the second user device 102 according to the notification message. The first user device 101 and the second user device 102 use the online meeting application programs installed therein to participate in the online meeting set up by the meeting server 103. It should be understood that the notification message of the present invention also includes the access permission of the second user device 102 to the document content. Therefore, when the second user device 102 reads or stores the received document content (e.g., if the first user device 101 presents the document content), the corresponding actions are performed based on the access permissions of the second user device 102 set by the first user device 101. For example, the access permissions include a permission to read the document content or a permission to store the document content, etc.

In Step S07, when presenting the document content, the first user device 101 triggers the plugin in the document application program such that the online meeting application program retrieves the document content and transmits the document content to the meeting server 103. In this step, it is indicated that the user of the first user device 101 can trigger a plugin in the document application program of a document file that has been already opened (such as a slide file) at any time during the online meeting, based on the user's need to present document content. This allows the user to save the time of searching for document files during the online meeting and avoid the possibility of failing to find the desired document due to oversight or forgetfulness.

In Step S08, the meeting server 103 transmits the document content to the second user device 102 according to the meeting member data.

In Step S09, the online application program installed in the second user device 102 presents the document content.

According to the forgoing description, the method for presenting documents in online meetings of the present invention allows the user to open the document file as backup data with the document application program and then to start the online meeting application program to set up an online meeting. When the user thinks that it is necessary to present the document content of the document file as reference data during the online meeting, the plugin in the document application program can be triggered at any time such that the online meeting application program transmits the document content to the meeting server 103. Then, the meeting server 103 transmits the document content to other participants of the online meeting. If necessary, one can also set the access permissions of other participants to the received document content.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for presenting documents in online meetings, applied to an online meeting system comprising a plurality of user devices and a meeting server, comprising:

Step (A): setting a plugin in a document application program that is installed in a first user device of the plurality of user devices;

Step (B): by the first user device, opening a document file with the document application program to display a document content of the document file;

Step (C): triggering the plugin to start an online meeting application program that is installed in the first user device, and selecting a part of the plurality of user devices in a contact list as meeting member data, wherein the contact list is provided by the online meeting application program that is installed in the first user device;

Step (D): by the online meeting application program, retrieving the document content and transmitting an online meeting setting command and the document content to the meeting server, wherein the online meeting setting command comprises the meeting member data and the meeting member data comprise a second user device of the plurality of user devices and access permissions of the second user device to the document content, wherein the access permissions of the document content comprises a permission to read the document content and to store the document content;

Step (E): by the meeting server, setting up an online meeting data and transmitting a notification message and the document content to the second user device according to the meeting member data; and Step (F): by the second user device, starting an online meeting application program installed in the second user device to present the document content according to the notification message, wherein the first user device and the second user device use the online meeting application programs installed therein to participate in the online meeting set up by the meeting server.

2. The method for presenting documents in online meetings according to claim 1, wherein in Step (C), the online meeting application program installed in the first user device uses a given user device list as the meeting member data.

3. A method for presenting documents in online meetings, applied to an online meeting system comprising a plurality of user devices and a meeting server, comprising:

Step (A): setting a plugin in a document application program that is installed in a first user device of the plurality of user devices;

Step (B): by the first user device, opening a document file with the document application program to display a document content of the document file;

Step (C): triggering the plugin to start an online meeting application program that is installed in the first user device, and selecting a part of the plurality of user devices in a contact list as meeting member data, wherein the contact list is provided by the online meeting application program that is installed in the first user device;

Step (D): by the online meeting application program, transmitting an online meeting setting command to the meeting server, wherein the online meeting setting command comprises the meeting member data and the meeting member data comprise a second user device of the plurality of user devices and access permissions of the second user device to the document content, wherein the access permissions of the document content comprises a permission to read the document content and to store the document content;

Step (E): by the meeting server, setting up an online meeting and transmitting a notification message to the second user device according to the meeting member data;

Step (F): by the second user device, starting an online meeting application program installed in the second user device according to the notification message, wherein the first user device and the second user device use the online meeting application programs installed therein to participate in the online meeting set up by the meeting server;

Step (G): when presenting the document content, the first user device triggers the plugin in the document application program such that the online meeting application program retrieves the document content and transmits the document content to the meeting server;

Step (H): by the meeting server, transmitting the document content to the second user device according to the meeting member data; and Step (I): by the online application program installed in the second user device, presenting the document content.

4. The method for presenting documents in online meetings according to claim 3, wherein in Step (C), the online meeting application program installed in the first user device uses a given user device list as the meeting member data.

5. A system for presenting documents in online meetings, comprising:

a first user device of a plurality of user devices installed with a document application program and an online meeting application program therein and configured to set a plugin in the document application program and open a document file with the document application program to display a document content of the document file;

a meeting server;

a second user device of the plurality of user devices installed with a document application program therein;

wherein when the first user device triggers the plugin, the online meeting application program installed in the first user device starts to select a part of the plurality of user devices in a contact list as meeting member data, wherein the contact list is provided by the online meeting application program that is installed in the first user device, and the online meeting application program starts to retrieve the document content and transmit an online meeting setting command and the document content to the meeting server, and the online meeting setting command comprises the meeting member data and the meeting member data comprise the second user device and access permissions of the second user device to the document content, wherein the access permissions of the document content comprises a permission to read the document content and to store the document content;

wherein the meeting server sets up an online meeting and transmits a notification message and the document content to the second user device according to the meeting member data; and wherein the second user device starts an online meeting application program installed in the second user device to present the document content according to the notification message, wherein the first user device and the second user device use the online meeting application programs installed therein to participate in the online meeting set up by the meeting server.

6. A system for presenting documents in online meetings, comprising:

a first user device of a plurality of user devices installed with a document application program and an online meeting application program therein and configured to set a plugin in the document application program and open a document file with the document application program to display a document content of the document file;

a meeting server;

a second user device of the plurality of user devices installed with a document application program therein;

wherein an online meeting application program installed in the first user device starts to select a part of the plurality of user devices in a contact list as meeting member data, wherein the contact list is provided by the online meeting application program that is installed in the first user device, and the online meeting application program start to transmit an online meeting setting command to the meeting server, and the online meeting setting command comprises the meeting member data and the meeting member data comprise the second user device and access permissions of the second user device to the document content, wherein the access permissions of the document content comprises a permission to read the document content and to store the document content;

wherein the meeting server sets up an online meeting and transmits a notification message to the second user device according to the meeting member data, the second user device starts the online meeting application program installed in the second user device according to the notification message, wherein the first user device and the second user device use the online meeting application programs installed therein to participate in the online meeting set up by the meeting server; and wherein when presenting the document content, the first user device triggers the plugin in the document application program such that the online meeting application program retrieves the document content and transmits the document content to the meeting server, the meeting server transmits the document content to the second user device according to the meeting member data, and the online application program installed in the second user device presents the document content.

* * * * *